(12) United States Patent
Schwartz et al.

(10) Patent No.: US 8,575,243 B2
(45) Date of Patent: Nov. 5, 2013

(54) LATEX PAINTS WITH IMPROVED FADE RESISTANCE

(75) Inventors: Russell Schwartz, Montgomery, OH (US); Paul A. Merchak, Loveland, OH (US); Steven Johnson, Fairfield, OH (US)

(73) Assignee: Sun Chemical Corporation, Parsippany, NJ (US)

( * ) Notice: Subject to any disclaimer, the term of this patent is extended or adjusted under 35 U.S.C. 154(b) by 268 days.

(21) Appl. No.: 12/921,813

(22) PCT Filed: Mar. 12, 2009

(86) PCT No.: PCT/US2009/036948
§ 371 (c)(1),
(2), (4) Date: Sep. 14, 2010

(87) PCT Pub. No.: WO2009/114684
PCT Pub. Date: Sep. 17, 2009

(65) Prior Publication Data
US 2011/0028610 A1   Feb. 3, 2011

Related U.S. Application Data

(60) Provisional application No. 61/035,793, filed on Mar. 12, 2008.

(51) Int. Cl.
*C09D 113/02* (2006.01)

(52) U.S. Cl.
USPC ............. 524/88; 524/190; 524/109; 524/92; 524/94; 524/358

(58) Field of Classification Search
USPC .................. 524/88, 92, 94, 190, 109, 358
See application file for complete search history.

(56) References Cited

U.S. PATENT DOCUMENTS

| | | | |
|---|---|---|---|
| 4,036,652 A * | 7/1977 | Rothmayer | ............ 524/88 |
| 4,420,340 A | 12/1983 | Mohr et al. | |
| 4,782,109 A | 11/1988 | DuLaney et al. | |
| 6,047,436 A | 4/2000 | Rohrbach et al. | |
| 6,117,685 A | 9/2000 | Omatsu et al. | |
| 6,218,012 B1 | 4/2001 | Rota et al. | |
| 6,336,964 B1 | 1/2002 | Omatsu et al. | |
| 6,531,223 B1 | 3/2003 | Rota et al. | |
| 6,589,479 B2 | 7/2003 | Dufresne et al. | |
| 6,632,865 B2 | 10/2003 | Kim et al. | |
| 6,852,281 B2 | 2/2005 | Inoue et al. | |
| 7,090,704 B2 | 8/2006 | Ouziel | |
| 2006/0014855 A1 | 1/2006 | House et al. | |
| 2006/0201383 A1 | 9/2006 | Moffatt et al. | |

FOREIGN PATENT DOCUMENTS

| | | | |
|---|---|---|---|
| EP | 1 518 904 A1 * | 7/1997 | |
| EP | 1 518 904 | 3/2005 | |

OTHER PUBLICATIONS

International Search Report and Written Opinion dated Oct. 6, 2009 for Application No. PCT/US2009/036948.
"Performance Intermediates, High purity specialty monomer—chemical building blocks," Ciba Specialty Chemicals (2002) specialty_monomers@cibasc.com.

* cited by examiner

*Primary Examiner* — Robert D. Harlan
(74) *Attorney, Agent, or Firm* — Frost Brown Todd LLC

(57) ABSTRACT

A paint comprising a latex base, organic pigment, and an aqueous solution resin solid with improved stability to atmospheric pollutants.

26 Claims, No Drawings

LATEX PAINTS WITH IMPROVED FADE RESISTANCE

CROSS REFERENCE TO RELATED APPLICATIONS

The present application hereby claims the benefit of the provisional patent application titled "Method to Reduce Fading in Pigmented Paint", Ser. No. 61/035,793, filed on Mar. 12, 2008, the disclosure of which is hereby incorporated by reference in its entirety.

BACKGROUND

Latex paint compositions used for coatings are typically made up of at least three components: binder, diluent, and pigments. In a latex paint, the binder is typically an emulsion polymer that forms a film as the paint dries. A diluent is typically a solvent that evaporates as the paint dries. A typical diluent in latex paint is water. Typical pigments include inorganic, organic, and carbon black. Additional ingredients may include coalescing aids, thickening aids, dispersing aids, defoamers, biocides, etc. to improve paint properties.

Pigments may be divided into two major categories, inorganic and organic pigments. Examples of inorganic pigments are various metal oxides such as C.I. Pigment Red 101, C.I. Pigment Yellow 42, C.I. Pigment Brown 6, C.I. Pigment White 4 and C.I. Pigment White 6. Examples of classes of organic pigments are the anthraquinone, azo, diketopyrrolopyrrole, dioxazine, indanthrone, indigo, isoindoline, isoindolinone, perylene, phthalocyanine, quinacridone, and quinophthalone classes. Carbon black, while containing carbon is not considered to be an organic pigment.

Organic pigments typically provide improved chromatic strength and brilliance of shade compared to inorganic pigments, but are generally less stable than inorganic pigments and tend to fade faster. Light, heat, humidity, and atmospheric pollutants, such as ozone, $SO_2$, and $NO_x$, are major factors that contribute to the fading of pigments.

Consequently, a significant need exists for new formulations of latex paints containing organic pigments which are less susceptible to fading due to light, heat, humidity, and atmospheric pollutants.

DETAILED DESCRIPTION

A paint, comprising a latex base, an organic pigment, and greater than about 0.2 w/w % of a solution resin solid. The paint may be an architectural paint, or a paint useful for other purposes.

Latex bases used for paint coatings are based on an aqueous dispersion or emulsion of synthetic resin. Additional ingredients may include but are not limited to inorganic pigments and fillers, coalescing aids, thickening aids, dispersing aids, defoamers, biocides, plasticizers, etc. to improve paint properties. Liquid colorants containing individual or combinations of inorganic, organic or carbon black pigments are added to the latex base to provide a specific color typically at the point of sale or during manufacturing of specific colors for distribution. As used herein, the term 'latex base' may comprise one or more latex bases. A latex base may be an interior, exterior, or other base, which would be known to one of ordinary skill in the art.

Paints containing organic pigments fade faster than paints containing inorganic pigments without any organic pigments. Fading is not a large concern for paints made from inorganic pigments. The major factors that contribute to fading in paints containing organic pigments are light, heat, humidity, and atmospheric pollutants, especially ozone. The advantages of paints containing organic pigments are that they offer improve chromatic strength and brilliance of shade. Examples of classes of organic pigment are anthraquinone, azo, diketopyrrolopyrrole, dioxazine, indanthrone, indigo, isoindoline, isoindolinone, perylene, phthalocyanine, quinacridone, and quinophthalone, but is not limited to these. As used herein, the term 'organic pigment' may comprise one or more organic pigments.

Examples of the Color Index of these organic pigments are, but not limited to: Pigment Yellow 1, Pigment Yellow 3, Pigment Yellow 12, Pigment Yellow 13, Pigment Yellow 14, Pigment Yellow 15, Pigment Yellow 17, Pigment Yellow 62, Pigment Yellow 65, Pigment Yellow 73, Pigment Yellow 74, Pigment Yellow 83, Pigment Yellow 93, Pigment Yellow 95, Pigment Yellow 97, Pigment Yellow 109, Pigment Yellow 110, Pigment Yellow 111, Pigment Yellow 120, Pigment Yellow 128, Pigment Yellow 129, Pigment Yellow 139, Pigment Yellow 147, Pigment Yellow 151, Pigment Yellow 154, Pigment Yellow 168, Pigment Yellow 174, Pigment Yellow 175, Pigment Yellow 176, Pigment Yellow 180, Pigment Yellow 181, Pigment Yellow 185, Pigment Yellow 188, Pigment Yellow 191:1, Pigment Yellow 194, Pigment Yellow 199, Pigment Orange 5, Pigment Orange 13, Pigment Orange 16, Pigment Orange 22, Pigment Orange 31, Pigment Orange 34, Pigment Orange 46, Pigment Orange 48, Pigment Orange 49, Pigment Orange 61, Pigment Orange 64, Pigment Orange 71, Pigment Orange 73, Pigment Red 2, Pigment Red 4, Pigment Red 5, Pigment Red 22, Pigment Red 23, Pigment Red 42, Pigment Red 48:1, Pigment Red 48:2, Pigment Red 48:3, Pigment Red 48:4, Pigment Red 52:1, Pigment Red 52:2, Pigment Red 53:1, Pigment Red 57:1, Pigment Red 112, Pigment Red 122, Pigment Red 144, Pigment Red 146, Pigment Red 166, Pigment Red 170, Pigment Red 177, Pigment Red 179, Pigment Red 184, Pigment Red 185, Pigment Red 188, Pigment Red 202, Pigment Red 206, Pigment Red 214, Pigment Red 209, Pigment Red 220, Pigment Red 221, Pigment Red 222, Pigment Red 242, Pigment Red 248, Pigment Red 254, Pigment Red 255, Pigment Red 262, Pigment Red 264, Pigment Red 270, Pigment Red 272, Pigment Brown 23, Pigment Brown 25, Pigment Brown 41, Pigment Brown 42, Pigment Green 7, Pigment Green 36, Pigment Blue 15:1, Pigment Blue 15:2, Pigment Blue 15:3, Pigment Blue 15:4, Pigment Blue 15:6, Pigment Blue 16, Pigment. Blue 25, Pigment Blue 26, Pigment Blue 29, Pigment Blue 60, Pigment Blue 64, Pigment Blue 66, Pigment Blue 79, Pigment Violet 19, Pigment Violet 23, Pigment Violet 29, Pigment Violet 31, Pigment Violet 32, Pigment Violet 37, and Pigment Violet 55.

Solution resin solids are polymers that may dissolve in water. Typically hydrocarbon polymers are hydrophobic. The water solubility of hydrophobic polymers is enhanced by the presence of polar, alkaline-soluble, or acid-soluble groups on the polymer. In one embodiment the solution resin solid contains at least one type of alkaline-soluble group. Examples of alkaline-soluble groups are phenolic hydroxy group, a sulfonamido group, an acid group of a substituted sulfonamido type, a carboxylic acid group, a sulfonic acid group, and a phosphoric acid group. In one embodiment the solution resin solid contains at lease one acid-soluble group. Examples of acid-soluble groups are primary, secondary and tertary amines. Other solubilizing enhancing groups are ammonium, sulfonium and phosphonium cationic substituents. The solubility enhancing group or groups may be present on any position on the polymer chain, for example on the main polymer chain, on the side chains or branches, or on the ends.

In one embodiment, the paint comprises not less than about 0.2%, 0.6%, 1.7%, 3%, or 5% solution resin solid. The paint may comprise not more than about 60%, 50%, 20%, 10% or 5% solution resin solid. Decreasing the amount of solution resin solid in the paint composition is desirable because the paint will have retain acceptable film properties for paint use. Acceptable film properties include but are not limited to durability and film integrity that impact the life-time of the paint, rub resistance, chip resistance, and tack.

As used herein, the term 'solution resin solid' may comprise one or more solution resin solids. A 'solution resin' comprises dissolved solution resin solid.

A solution resin solid may be soluble in an aqueous solution under basic, acidic, or pH neutral conditions. The addition of a base to an aqueous mixture containing an undissolved alkaline-soluble resin may raise the pH sufficiently to allow the solution resin solid to be dissolved. The aqueous solution may have a pH of not less than about 7, or from about 7.5 to about 9.5. The solution resin may have an acid number that ranges from about 60 to about 400, or from about 150 to about 300.

In a similar way, an acid may be added to an aqueous mixture containing an undissolved acid-soluble solution resin solid to lower the pH sufficiently to allow the solution resin solid to be dissolved in the aqueous solution. The aqueous solution may have a pH of not more than about 7.

Polymers may be made from a single monomer species, a homopolymer; or more than one monomer species, a copolymer. Copolymers may be alternating, periodic, random, block, or graft. The polymer structure may be linear or branched.

In one embodiment, the solution resin solid may be a polyurethane, polyamide, polyester, polyvinyl, polystyrene, polyacrylate, or poly(meth)acrylate. In another embodiment the solution resin solid is polystyrene acrylic acid copolymer, such as Joncryl® 678.

In one embodiment the solution resin solid is about 3 w/w % to about 60 w/w % of the paint. In another embodiment the solution resin solid is about 3 w/w % to about 10 w/w % of the paint. In another embodiment the solution resin solid is about 3 w/w % to about 6 w/w % of the paint. The solution resin solid w/w % is calculated by multiplying the mass of the solution resin by the percentage of the solution resin solids, and dividing by the total mass of the paint.

In one embodiment the solution resin solid has an average weight that provides the required resistance properties, and acceptable film properties for typical paint use. In another embodiment the solution resin solid has an average molecular weight that ranges from about 1,000 to about 50,000, or from about 1,500 to about 20,000.

In one embodiment the solution resin solid has a glass transition temperature that ranges from about 0° C. to about 300° C., or from about 50° C. to about 150° C.

After the paint dries, the surface of the dried paint has a finish, or a decorative texture or appearance. The finish may be matte, flat, eggshell, satin, semi-gloss, glossy, or other finish. The latex base is one of the component that determines the finish of the dried paint. In one embodiment, the paint dries to a matte or flat finish. In another embodiment, the paint dries to a eggshell or satin finish. In another embodiment, the paint dries to a semi-gloss or glossy finish.

A paint may be useful for interior, exterior, or other purposes.

While the present disclosure has illustrated by description several embodiments and while the illustrative embodiments have been described in considerable detail, it is not the intention of the applicant to restrict or in any way limit the scope of the claims to such detail. Additional advantages and modifications may readily appear to those skilled in the art.

EXAMPLES

Evaluation Procedure

The procedure shown below was used to test various latex bases, organic pigments, and solution resin solids for fade resistance through exposure to ozone.

Colorant Dispersion Preparation: 42.2 g Joncryl® SCX-674, 28.3 g water, 38.0 g pigment, 2 drops of defoamer, and 250 g zirconium media are added to an 8 oz. jar and placed on a paint shaker for 30 minutes to disperse the pigment.

Paint Preparation: 50 g latex base (50 g), 0.50 g dispersion and the solution resin amount are added to a 4 oz. jar and mixed on a paint shaker until thoroughly combined. Drawdown paint on a white Leneta card using a 0.003 Byrd applicator and dry at ambient conditions.

Accelerated Ozone Exposure: One inch square dried paint samples are placed into a sealed environmental chamber and exposed to ozone for 4 hours. Ozone is continuously supplied through an inlet port at a rate of 300 mg/hour into a 1 cubic foot chamber with a hose from the outlet port submersed into water to prevent an increase of pressure in the chamber.

Strength Determination: The retained relative strength of the exposed to the unexposed samples was measured on a Datacolor Model SF600+ (SAV, SCI) colorimeter at the maximum absorption wavelength using the Kubelka-Munk method.

Examples 1, 2 & 3

Three pigments were tested using the procedure above. The three commercially available pigments used were: C.I. Pigment Blue 15.3 (Sun Chemical 249-1282), C.I. Pigment Red 254 (Sun Chemical 226-0200), and commercially available C.I. Pigment Red 255. The latex base was a commercial interior flat tinting base. Various weights of Joncryl® 61 (a 35% solution of the solution resin solid, Joncryl® 678 flake) were added in the Paint Preparation step. The % Solution Resin Solids is the weight percent of solution resin solid per the total weight for the wet paint formulation. The following tables shows the strength results after accelerated ozone exposure:

Example 1: 249-1282

| Weight Solution Resin Joncryl® 61 (grams) | Strength | % Solution Resin Solids |
|---|---|---|
| 0 | 79.9 | 0% |
| 0.25 | 83.0 | 0.17% |
| 0.5 | 81.4 | 0.34% |
| 1.0 | 85.5 | 0.68% |
| 2.5 | 90.4 | 1.7% |
| 5.0 | 99.8 | 3.2% |

Example 2: 226-0200

| Weight Solution Resin Joncryl® 61 (grams) | Strength | % Solution Resin Solids |
|---|---|---|
| 0 | 25.2 | 0% |
| 2.5 | 40.9 | 1.7% |
| 5.0 | 50.0 | 3.2% |
| 10.0 | 72.6 | 5.8% |
| 20.0 | 86.7 | 9.9% |

Example 3: C.I. Pigment Red 255

| Weight Solution Resin Joncryl® 61 (grams) | Strength | % Solution Resin Solids |
|---|---|---|
| 0 | 28.3 | 0% |
| 2.5 | 37.0 | 1.7% |
| 5.0 | 50.8 | 3.2% |
| 10.0 | 78.1 | 5.8% |
| 20.0 | 101.2 | 9.9% |

Example 4

Three different solution resin solids were tested using the procedure above. Commercially available C.I. Pigment Red 255 was used, and the latex base was a commercial interior flat tinting base. The solution resin solids were Joncryl® 682 flake (MW=1700, acid number=238 & Tg=56° C.), Joncryl® 678 flake (MW=8500, acid number=215 & Tg=85° C.) & Joncryl® 690 flake (MW=16500, acid number=240 & Tg=102° C.), used as solutions Joncryl® 50 (@ 50% solids), Joncryl® 61 (@ 36% solids) & Joncryl® 70 (@ 30% solids), respectively. These were use to prepare samples at concentrations of 0%, 3%, and 6% solution resin solids. The following table shows the strength results after accelerated ozone exposure:

| Color Strength of Test Samples | | | |
|---|---|---|---|
| % Solution Resin solids | Joncryl® 682 | Joncryl® 678 | Joncryl® 690 |
| 0% | 28.0 | 28.0 | 28.0 |
| 3% | 86.1 | 50.8 | 85.3 |
| 6% | 89.1 | 87.1 | 90.4 |

Example 5

Solution resin solids at three different concentrations was tested using the procedure above. The interior flat tinting bases shown below, were used with C.I. Pigment Blue 15:3 (Sun Chemical 249-1282), and Joncryl® 678 solution resin solid, used as solution Joncryl® 61 with 35% solids, at concentrations of 0%, 3%, and 6% solution resin solids. The following table shows the strength results after accelerated ozone exposure:

| Color Strength of Test Samples | | | |
|---|---|---|---|
| Latex Base | No Solution Resin Solids | 3% Solution Resin Solids | 6% Solution Resin Solids |
| Commercial Base 1 | 82.6 | 93.0 | 93.5 |
| Commercial Base 2 | 85.2 | 87.0 | 96.5 |
| Commercial Base 3 | 86.1 | 93.1 | 94.0 |

Example 6

Five commercially available tinted interior flat latex paints were tested for ozone stability with and without 6% solution resin solids. The solution resin solid was Joncryl® 678 (as Joncryl® 61 solution resin @ 35% solids), used at the solution resin solid concentration shown. Each of the paints was matched by the paint supplier using their commercial colorants to a dried paint sample containing C.I. Pigment Blue 15.3 (Sun Chemical 249-1282). The solution resin was added to the purchased paint and mixed on a Harbil shaker for 15 minutes. Samples were prepared and tested using the procedure above. The following table shows the strength results after accelerated ozone exposure:

| Color Strength of Blue Test Samples | | |
|---|---|---|
| Latex Base | No Solution Resin Solids | 6% Solution Resin Solids |
| Commercial Base 4 | 47.1 | 89.9 |
| Commercial Base 5 | 49.1 | 91.3 |
| Commercial Base 6 | 65.0 | 96.5 |
| Commercial Base 7 | 72.2 | 94.5 |
| Commercial Base 8 | 86.9 | 95.2 |

Example 7

Five commercially available tinted interior flat latex paints were tested for ozone stability with and without 6% solution resin solid. The solution resin solid was Joncryl® 678 (as Joncryl® 61 solution resin @ 35% solids), used at the solution resin solid concentration shown. Each of the paints was visually matched by the paint supplier using their commercial colorants to a dried paint sample of C.I. Pigment Red 122 (Sun Chemical 228-0122). The solution resin was added to the purchased paint and mixed on a Harbil shaker for 15 minutes. Samples were prepared and tested using the procedure above. The following table shows the strength results after accelerated ozone exposure:

| Color Strength of Red Test Samples | | |
|---|---|---|
| Latex Base | No Solution Resin Solids | 6% Solution Resin Solids |
| Commercial Base 9 | 75.5 | 94.5 |
| Commercial Base 10 | 81.4 | 91.0 |
| Commercial Base 11 | 83.4 | 94.1 |
| Commercial Base 12 | 86.4 | 98.4 |
| Commercial Base 13 | 89.3 | 96.8 |

Example 8

Nine commercially available tinted exterior flat and satin latex paints were tested for ozone stability with 0%, 3%, and 5% solution resin solids. The solution resin was Joncryl® 678 (as Joncryl® 61 solution resin @ 35% solids), used at the solution resin solid concentration shown. Each of the paints was matched by the paint supplier using their blue commercial colorants to a dried paint sample containing C.I. Pigment Blue 15.3 (Sun Chemical 249-1282). The solution resins were added to the purchased paint and mixed on a Harbil shaker for 15 minutes. Samples were prepared and tested using the procedure above. The following table shows the strength results after accelerated ozone exposure:

| | Color Strength of Test Samples | | |
|---|---|---|---|
| Latex Base | No Solution Resin Solids | 3% Solution Resin Solids | 5% Solution Resin Solids |
| Commercial Base A | 84 | 90 | 94 |
| Commercial Base B | 86 | 94 | 96 |
| Commercial Base C | 67 | 84 | 91 |
| Commercial Base D | 67 | 84 | 88 |
| Commercial Base E | 78 | 92 | 94 |
| Commercial Base F | 84 | 91 | 95 |
| Commercial Base G | 82 | 93 | 94 |
| Commercial Base H | 85 | 92 | 95 |
| Commercial Base I | 87 | 92 | 93 |

Example 9

A modified paint preparation process was used to prepare nine paint samples with equal total resin solids of 8.4%. The total resin solids is the sum of the solution resin solids and the latex base resin solids. Three C.I. Pigment Blue 254 pigments (Sun Chemical 226-0200, 226-7200 and 226-5254) and solution resin solid Joncryl® 678 (as Joncryl® 61 solution resin @ 35% solids), at concentrations of 0%, 3%, and 6% solution resin solids were used.

| | % in Formulation | | |
|---|---|---|---|
| Latex Base | No Solution Resin Solids | 3% Solution Resin Solids | 6% Solution Resin Solids |
| TiO$_2$ | 3.3 | 3.3 | 3.3 |
| Talc | 22.5 | 22.5 | 22.5 |
| Latex Resin Solid | 8.4 | 5.4 | 2.4 |
| % Solution Resin Solids | 0 | 3.0 | 6.0 |

The following table shows the strength results after accelerated ozone exposure:

| | Color Strength of Test Samples | | |
|---|---|---|---|
| Latex Base | No Solution Resin Solids | 3% Solution Resin Solids | 6% Solution Resin Solids |
| 226-0200 | 86.8 | 92.5 | 97.1 |
| 226-7200 | 63.7 | 93.8 | 99.9 |
| 226-5254 | 57.3 | 87.4 | 96.3 |

The invention claimed is:

1. A paint, comprising:
   a) a latex base, that comprises water,
   b) organic pigment, and
   c) not less than about 0.2 w/w % of a solution resin solid dissolved in the water.

2. The paint of claim 1, wherein the class of the organic pigment is selected from the group consisting of: anthraquinone, azo, diketopyrrolopyrrole, dioxazine, indanthrone, indigo, isoindoline, isoindolinone, perylene, phthalocyanine, quinacridone, and quinophthalone.

3. The paint of claim 1, wherein the class of organic pigment is selected from the group consisting of: diketopyrrolopyrrole, phthalocyanine, and quinacridone.

4. The paint of claim 1, wherein the solution resin solid ranges from about 3 w/w % to about 60 w/w % of the paint.

5. The paint of claim 1, wherein the solution resin solid ranges from about 3 w/w % to not more than 10 w/w % of the paint.

6. The paint of claim 1, wherein the solution resin solid contains at least one alkaline-soluble group.

7. The paint of claim 1, wherein the solution resin solid contains at least one alkaline-soluble group selected from the group consisting of: phenolic hydroxy, sulfonamido, sulfonamido acid, carboxylic acid, sulfonic acid, and phosphoric acid.

8. The paint of claim 1, wherein the solution resin solid contains at least one carboxylic acid group.

9. The paint of claim 1, wherein the solution resin solid has an acid number that ranges from about 60 to about 400.

10. The paint of claim 6, wherein the solution resin solid is dissolved when the pH of the paint is not less than about 7.

11. The paint of claim 10, wherein the solution resin solid is dissolved when the pH of the paint is in the range of from about 7.5 to about 9.5.

12. The paint of claim 1, wherein the solution resin solid contains at least one acid-soluble group.

13. The paint of claim 1, wherein the solution resin solid contains at least one amine group.

14. The paint of claim 12, wherein the solution resin solid dissolves in a solution when the pH of the solution is not more than about 7.

15. The paint of claim 1, wherein the solution resin solid is selected from the group consisting of: a linear polymer, a copolymer, a branched polymer, a block copolymer, and a graft polymer.

16. The paint of claim 1, wherein the solution resin solid has a main chain selected from the group consisting of: polyurethane, polyamide, polyester, polyvinyl, polystyrene, polyacrylate, and poly(meth)acrylate.

17. The paint of claim 1, wherein the solution resin solid has an average weight providing the required resistance properties, and acceptable film properties for paint use.

18. The paint of claim 1, wherein the solution resin solid has an average molecular weight ranging from about 1,000 to about 50,000.

19. The paint of claim 1, wherein the solution resin solid has an average molecular weight ranging from about 1,500 to about 20,000.

20. The paint of claim 1, wherein the solution resin solid has a glass transition temperature ranging from about 0° C. to about 300° C.

21. The paint of claim 1, wherein the latex base dries to a matte or flat finish.

22. The paint of claim 1, wherein the latex base dries to an eggshell or satin finish.

23. The paint of claim 1, wherein the latex base dries to a semi-gloss or glossy finish.

24. A paint comprising a solution resin solid, wherein the paint has a color strength of greater than about 87% after accelerated ozone exposure.

25. A paint comprising a solution resin solid, wherein the paint has a greater than about 5% improvement in color strength retention after accelerated ozone exposure compared to the same paint without the solution resin solid.

26. The paint of claim 25, wherein the paint comprises a latex base, organic pigment, and greater than about 0.2 w/w % of a solution resin solid.

* * * * *